H. L. WHIPPS.
STEEL TRAP.
APPLICATION FILED MAY 8, 1911.
1,010,553.
Patented Dec. 5, 1911.
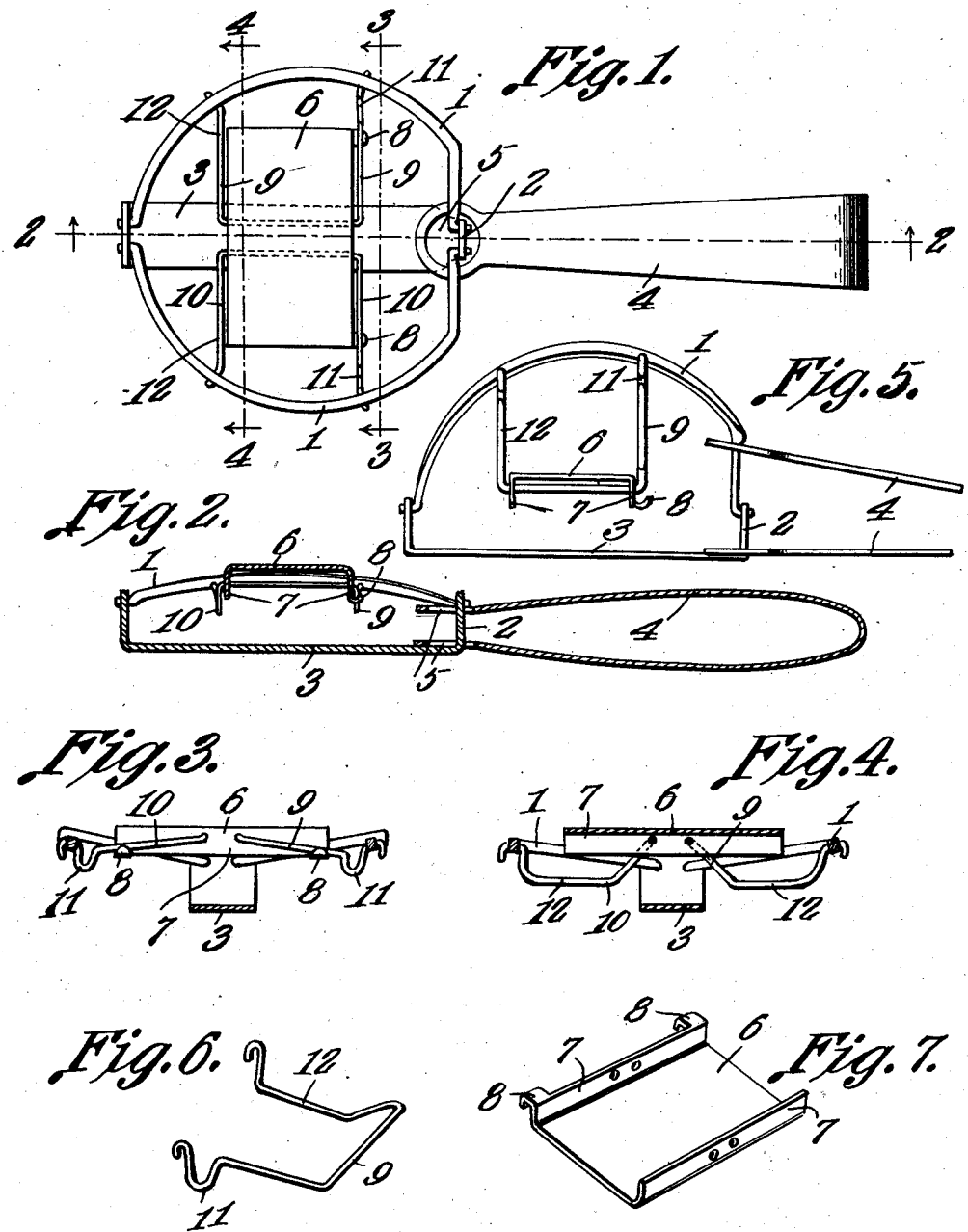
Witnesses
J. P. Tomlin
L. H. Wilson
Harry L. Whipps,
Inventor
by C. A. Snow & Co.
Attorneys

UNITED STATES PATENT OFFICE.

HARRY L. WHIPPS, OF LESUEUR CENTER, MINNESOTA, ASSIGNOR OF ONE-HALF TO LLOYD L. WHIPPS, OF LESUEUR CENTER, MINNESOTA.

STEEL TRAP.

1,010,553. Specification of Letters Patent. Patented Dec. 5, 1911.

Application filed May 8, 1911. Serial No. 625,834.

*To all whom it may concern:*

Be it known that I, HARRY L. WHIPPS, a citizen of the United States, residing at Lesueur Center, in the county of Lesueur and State of Minnesota, have invented a new and useful Steel Trap, of which the following is a specification.

This invention relates to improvements in traps, especially of the rat-trap type, although it may be readily adapted for entrapping or destroying other animals than such as aforesaid indicated.

The object of the invention is to provide for greatly minimizing the number of parts entering into the formation or construction of the device.

A further object is to simplify the operation of setting or adjusting the trap for use.

A still further object of the invention is to effect such setting operation by simply collapsing or compressing the resilient jaw-stressing member and exerting an upward pressure upon the bait carrying or receiving platform, from its underside.

A still further object is to provide for tripping or depressing the bait receiving platform, as by the pressure imposed thereon as the animal puts its foot or feet thereon in an effort to obtain the bait, thus resulting in catching or securing the animal between the resiliently actuated jaws.

A still further object of the invention is to carry out the aforesaid ends in a simple, expeditious and effective manner.

The invention consists of certain instrumentalities and features substantially as hereinafter fully disclosed and defined by the claims.

In the accompanying drawings illustrating the preferred embodiment of my invention, wherein it will be understood that various changes and modifications may be made therein as relates to the details of the construction and arrangement of the parts without departing from the spirit of the invention: Figure 1 is a plan view of the device or trap, as set. Fig. 2 is a vertical longitudinal section thereof as produced on the line 2—2 of Fig. 1 viewing in the direction of the arrow. Fig. 3 is a transverse section taken on the line 3—3 of Fig. 1, viewing in the direction of the arrow. Fig. 4 is a like section produced on the line 4—4 of Fig. 1, viewing in the direction of the arrow. Fig. 5 is a broken side elevation of the device in its initial or unset position. Fig. 6 is a detached perspective of one of the bait platform, pivoting or suspensioning members. Fig. 7 is a like view of the bait platform in inverted position.

In carrying out my invention, I suitably provide the usual animal engaging or securing jaws 1 which may be of the usual or preferred type, the same being preferably of general curved outline and having their outturned ends, which are opposed to each other, suitably pivoted in preferably up-bent or upstanding terminals 2 of a base or bar member 3. A suitable resilient member 4 which may be a strip of spring metal of general outline as disclosed by Figs. 1 and 2, approximately of bow-like contour, the ends of which are opposed to each other, have orifices 5 to receive one of the up-bent or upstanding terminals of the base or bar member 3, upon which terminal said ends of said resilient member are adapted to have vertical movement and also to engage the jaws 1 in the usual way, as will be readily appreciated.

A bait platform 6, preferably of the general outline as disclosed particularly by Fig. 7, although it may be of other construction, is suitably arranged intermediate of the base or bar member 3 and the jaws, and preferably having its general trend at right angles to the longitudinal plane or axis of said base member or bar. The bait platform 6 is preferably provided with downwardly extending lateral extensions or flanges 7, one of said extensions or flanges being itself equipped at its lower corner-edges with outwardly and preferably upturned projections or lugs 8 to serve a purpose which will be apparent hereinafter.

Suitable suspending or supporting, preferably bail-like arms or members 9 and 10 are provided for the bait platform 6, the inner transverse portions of the bails or arms being received by, and pivoting in apertures in the lateral extensions or flanges 7 of said platform. The lateral portions or arms proper, of the members 9 and 10, upon one side of the platform, are adapted to be engaged by, and to be received within the curved lugs 8 of the bait-platform as seen particularly in Fig. 3, while these lateral portions of said bails or members are downwardly extended, bent deflected, or curved as at 11 near their outer ends. The lateral portions of the suspending bails or members, upon the opposite side of the platform 6, are also downwardly extended, bent or curved as at 12, but do not engage the bait platform, or lugs thereon, as do the bail lateral portions above described. This deflecting or downwardly extending of the lateral portions of the bails provides for the bait platform rising above the general plane of the jaws 1, with the opening or spreading apart of said jaws, and the engagement of the arms of the bails, upon one side of said platform, with the lugs or projections 8, which engagement of said arms with said lugs will transmit the tension or stress of the jaw-actuating spring to the platform 8 during said rising movement of said platform and, when the points of connection of the arms with the platform have been carried by such movement to a plane above or out of horizontal alinement with the points of connection of said arms with said platform, said platform will be held against reverse movement or being tripped by such spring tension or stress. As is apparent, a locking action between the jaws and the platform is thus produced for the effective and simultaneous retention of the jaws in their open position, and the platform in the aforesaid or bait receiving position. The trap it will be seen, when in the thus described position is set and, in event of the animal placing its foot or feet upon the platform, in attempting to secure the bait, which may be placed thereon, its weight will overcome the retaining action of the bails or members 9 and 10, the latter pivoting or turning in their connections in the platform under such weight and allowing the platform to be depressed. This depression of the platform will result, it is obvious, under the recoil action of the resilient member 4, previously collapsed or compressed in setting the trap, in the forcible closing of the jaws and accordingly in effecting the securing of the animal between the jaws, with an effective or deadly grip or action. In setting or initially actuating the trap, this may be readily accomplished by gripping and requisitely or suitably compressing the resilient member 4, the jaws by gravity then falling apart, and at the same time pressing upwardly with the other hand upon the bait platform, from its underside, which latter pressure will raise the platform to its elevated position as above indicated, resulting, with the aid of the stress or pressure synchronously delivered upon the jaws, in effecting the setting of the trap, as is apparent.

The device may be adapted, it is evident for entrapping animals of other or larger character, simply by varying the dimensions thereof, in which case, however, it is designed to equip or arm the jaws with teeth, which may be readily effected, it is obvious.

From the foregoing description, taken in connection with the accompanying illustration or drawing, it is considered that the advantages and benefits of my invention have been made fully apparent, it being characterized for extreme simplicity, embracing the minimum number of parts, is readily actuated, or set, and is inexpensive of manufacture.

What is claimed is:

1. A device of the character described, including pivoted resiliently stressed jaws, a bait-platform, pivoted connections between said jaws and said platform and means adjunctive of said platform, adapted for engagement with said pivoted connection intermediate the points of attachment of the latter to said jaws and said platform, as said platform is adjusted to elevated position.

2. A device of the character described, including pivoted resiliently stressed jaws, a bait-platform, pivoted connections between said jaws and said platform and lugs on said platform adapted for engagement with said pivoted connections, intermediate the points of attachment of the latter to said jaws and said platform, as said platform is adjusted to elevated position.

3. A device of the character described, including pivoted resiliently stressed jaws, a bait-platform and pivoted arms intermediate said jaws and said platform, said platform having lateral lugs thereon intermediate the points of connections between said bait platform and said jaws, adapted for engagement with said arms as said platform is adjusted to elevated position.

4. A device of the character described, comprising pivoted resiliently stressed jaws, a bait platform, suspending members for said platform, including arms pivoted to said platform and having downwardly deflected portions and connected to said jaws beyond said deflected portions, said platform having lateral members engaged by said arms as the platform is moved into elevated position.

5. A device of the character described, comprising pivoted resiliently stressed jaws, a bait platform, suspending members for said platform including bail-like arms hung in said platform, and having connection with said jaws, said members having their lateral portions upon one side of said platform formed with downwardly deflected portions intermediate their points of attachment with respect to said platform and said jaws.

6. A device of the character described, comprising pivoted resilient stressed jaws, a bait platform, suspending members for said platform including bail-like arms, said platform having downward extensions upon its underside, having apertures therein receiving transversely the portions of said bail-like arms, said arms having their outer ends connected to said jaws, and having downwardly deflected portions intermediate of their points of connection with said downward extensions and said jaws, said downward extensions having lateral upwardly curved lugs at their lower corner edges adapted to be engaged by the lateral portions of said bail like arms.

In testimony that I claim the foregoing as my own, I have hereto affixed my signature in the presence of two witnesses.

HARRY L. WHIPPS.

Witnesses:
L. L. WHIPPS,
H. A. ZIEBARTH.

---

Copies of this patent may be obtained for five cents each, by addressing the "Commissioner of Patents, Washington, D. C."